United States Patent
Andreoletti et al.

(10) Patent No.: US 9,971,497 B2
(45) Date of Patent: May 15, 2018

(54) METHOD AND TOUCH INTERFACE FOR CONTROLLING A PROTECTED EQUIPMENT ITEM OR FUNCTION

(71) Applicant: ZODIAC AERO ELECTRIC, Montreuil (FR)

(72) Inventors: Rémi Andreoletti, Chelles (FR); Romain De Bossoreille, Paris (FR)

(73) Assignee: Zodiac Aero Electric, Montreuil (FR)

( * ) Notice: Subject to any disclaimer, the term of this patent is extended or adjusted under 35 U.S.C. 154(b) by 490 days.

(21) Appl. No.: 14/501,618

(22) Filed: Sep. 30, 2014

(65) Prior Publication Data
US 2015/0100909 A1    Apr. 9, 2015

(30) Foreign Application Priority Data
Oct. 7, 2013    (FR) ..................... 13 59700

(51) Int. Cl.
| G06F 3/0488 | (2013.01) |
| G06F 3/0484 | (2013.01) |
| G06F 3/0482 | (2013.01) |

(52) U.S. Cl.
CPC .......... *G06F 3/0488* (2013.01); *G06F 3/0482* (2013.01); *G06F 3/04842* (2013.01); *G06F 2203/04808* (2013.01)

(58) Field of Classification Search
CPC .............. G06F 3/0488; G06F 9/30014; G06F 9/30032; G06F 3/0482; G06F 3/04842
USPC ........................................................ 715/771
See application file for complete search history.

(56) References Cited

U.S. PATENT DOCUMENTS

| 2009/0051660 A1 | 2/2009 | Feland, III et al. |
| 2009/0122018 A1* | 5/2009 | Vymenets ........... G06F 3/04817 345/173 |
| 2009/0237421 A1* | 9/2009 | Kim ...................... G06F 3/0485 345/661 |
| 2010/0188343 A1* | 7/2010 | Bach ...................... B60K 37/06 345/173 |

(Continued)

FOREIGN PATENT DOCUMENTS

| EP | 1450248 | 8/2004 |
| FR | 2911409 | 7/2008 |

OTHER PUBLICATIONS

French Search Report for FR 1359700 issued Jun. 2, 2014.

*Primary Examiner* — Jennifer To
*Assistant Examiner* — Terri Filosi
(74) *Attorney, Agent, or Firm* — Meyertons, Hood, Kivlin, Kowert & Goetzel, P.C.; Mark E. DeLuca

(57) ABSTRACT

A method for controlling an equipment item or a function by means of a touch interface includes: displaying, on a touch screen of the interface, a first graphical object that can be manipulated to control said equipment item or said function and a second graphical object having a first configuration in which the first graphical object is disabled and a second configuration in which the first graphical object can be activated; —detecting a first gesture on the screen tending to switch the second graphical object from the first configuration to the second configuration; activating said first graphical object while the second graphical object is being manipulated; and detecting a second gesture on the screen tending to activate the first graphical object. Applicable to the activation of a protected function implemented onboard an aircraft.

8 Claims, 1 Drawing Sheet

(56) References Cited

U.S. PATENT DOCUMENTS

2011/0157046 A1* 6/2011 Lee .................. G04G 21/08
   345/173
2012/0022720 A1 1/2012 Deleris et al.
2012/0242591 A1* 9/2012 Kawalkar ........... G06F 3/04886
   345/173
2014/0300555 A1* 10/2014 Rogers ............. G06F 3/0488
   345/173

* cited by examiner

METHOD AND TOUCH INTERFACE FOR CONTROLLING A PROTECTED EQUIPMENT ITEM OR FUNCTION

PRIORITY CLAIM

This application claims priority to French Patent Application No. 1359700.

BACKGROUND OF THE INVENTION

1. Field of the Invention

The invention relates, generally, to the touch interfaces and the control of an equipment item or of a function by means of such an interface. A particularly advantageous application of the invention relates to the control of equipment items or functions embedded onboard an aircraft and in particular in the field of avionics.

2. Description of the Relevant Art

Currently, the cockpit of an airplane is provided with a set of instruments and interfaces necessary to the piloting of the aircraft. These instruments and interfaces combine a set of buttons and actuators, with one or more states that make it possible, when actuated, to operate an avionics equipment item or function.

As is understood, some avionics equipment items or functions are likely to involve systems qualified as "critical" in as much as the change of state of the buttons or actuators that control them can have a direct impact on the flight. Activating them at the wrong moment can thus provoke incidents that might possibly end in a disaster.

Several scenarios can lead to such incidents.

They can firstly result from an erroneous activation, when the pilot presses the wrong button.

They can also be activated accidentally, when the pilot engages a button without noticing, for example when a clothing item becomes caught on a button or a lever or when an object drops onto it.

Of course, currently, various means are implemented to limit these wrong activations.

They can firstly involve organizing specific procedures requiring the pilots to sequence their action in a predefined and secure order or requesting the acknowledgement of an act by the user him or herself or by another user.

They can secondly involve modifying the arrangement of the buttons or levers so as to avoid inopportune manipulations.

With this in mind, it is known practice to provide for a mechanical interlocking of the buttons so that the pilot has to perform the activation with both hands or by two gestures, thus limiting careless mistakes.

It is also known practice to design buttons that have different shapes so that the pilot becomes accustomed to a touch associated with these functions. For example, one button can have a shape or a direction of activation that differs from the others.

Provision can also be made to produce the buttons using different materials or colors, a bright color potentially requiring particular attention from the pilot.

It is also possible to provide for the button or a lever to be physically protected against inadvertent activations. For example, a button can be placed in a recess, a wall or a shutter potentially provided to prevent an object or a clothing item catching on and activating the button.

Having the buttons and levers positioned in areas that are moderately accessible or that require a particular effort on the part of the pilot also makes it possible to avoid inopportune manipulations by ensuring that the pilot, when he or she has contacted the interface concerned, has done so intentionally.

It is, moreover, known practice to provide for functions or equipment items to be disabled by software in cases where there is no reason for them to be activated.

Moreover, the current trend is to dematerialize the human-machine interfaces conventionally based on the use of control buttons or levers and to implement them by means of touch interfaces using LCD screens on which graphical objects are displayed that simulate the functions or equipment items to be controlled.

As will be understood, the transition from a hardware control member to a touch button on the LCD screen renders some of the protections used conventionally to avoid wrong activations obsolete, in particular those linked to the use of locks, shutters, or, generally, protection elements preventing mechanical operation of control members before preliminary action on the protection elements.

Thus, with the advent of human-machine touch interfaces, there emerges the problem of how to secure critical functions, which becomes more acute in the aeronautical field.

It will also be understood that, while touch screens do indeed offer enhanced ease of use, their use deprives the user of a spatial dimension of use. Such is in particular the case with a function which, when it can be activated by means of a pushbutton, requires a positive action on the part of the user tending to depress the button whereas simply brushing a graphical object on an LCD screen makes it possible to activate this function such that the first level of security of this function disappears with the transition to a touch interface.

SUMMARY OF THE INVENTION

Embodiments described herein are intended to mitigate the abovementioned drawbacks and, in particular, to make it possible to implement security in the control of an equipment item or a function by means of a touch interface.

In an embodiment a method for controlling an equipment item or a function by means of a touch interface includes:
  displaying, on a touch screen of the interface, a first graphical object that can be manipulated to control said equipment item or said function and a second graphical object having a first configuration in which the first graphical object is disabled and a second configuration in which the first graphical object can be activated;
  detecting a first gesture on the screen tending to switch the second graphical object from the first configuration to the second configuration;
  activating said first graphical object while the second graphical object is being manipulated; and
  detecting a second gesture on the screen tending to activate the first graphical object.

In other words, the protected function is controlled by manipulating the interface with two fingers, one used to displace the second graphical object to release the first graphical object and the other used to actuate the first graphical object at the end of the first gesture but while the second graphical object is being manipulated and kept in the second configuration.

Any inopportune manipulation of the first graphical object is thus avoided.

Preferably, in the first configuration, the second graphical object is superposed on the first graphical object and, in the second configuration, the second graphical object is offset relative to the first graphical object.

In one implementation, the first configuration is a stable configuration, and the second configuration is an unstable configuration, the second graphical object being invoked in the first configuration.

Provision can be made, from the second configuration, for the second graphical object to be invoked in the first configuration on expiry of a time delay.

Provision can also be made, after the detection of the second gesture, for the appearance of the first graphical object to be modified.

Preferably, the second graphical object is in the form of a grid.

Moreover, in one implementation, the controlled equipment item or function is an equipment item or a function embedded onboard an aircraft.

In another embodiment, a touch interface includes a touch screen, a touch controller suitable for interpreting gestures on the screen, and a graphics processing unit associated with a central processing unit suitable for implementing a method as defined above.

Advantageously, in order to propose a more solid interface, the latter is, for example, an interface of infrared type.

It can then be suitable for constituting a human-machine interface embedded onboard an aircraft.

BRIEF DESCRIPTION OF THE DRAWINGS

Other aims, features and advantages of the invention will become apparent on reading the following description, given purely as a nonlimiting example, and with reference to the attached drawings in which.

Figure 1:
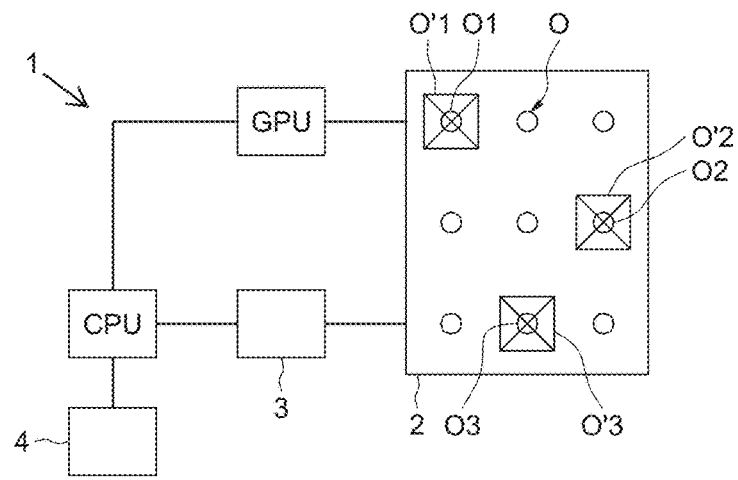
FIG. 1 is a block diagram of a touch interface.

While the invention may be susceptible to various modifications and alternative forms, specific embodiments thereof are shown by way of example in the drawings and will herein be described in detail. The drawings may not be to scale. It should be understood, however, that the drawings and detailed description thereto are not intended to limit the invention to the particular form disclosed, but to the contrary, the intention is to cover all modifications, equivalents, and alternatives falling within the spirit and scope of the present invention as defined by the appended claims.

DETAILED DESCRIPTION OF THE PREFERRED EMBODIMENTS

It is to be understood the present invention is not limited to particular devices or methods, which may, of course, vary. It is also to be understood that the terminology used herein is for the purpose of describing particular embodiments only, and is not intended to be limiting. As used in this specification and the appended claims, the singular forms "a", "an", and "the" include singular and plural referents unless the content clearly dictates otherwise. Furthermore, the word "may" is used throughout this application in a permissive sense (i.e., having the potential to, being able to), not in a mandatory sense (i.e., must). The term "include," and derivations thereof, mean "including, but not limited to." The term "coupled" means directly or indirectly connected.

Reference will first of all be made to FIG. 1, which illustrates the general architecture of a touch interface, designated by the general numeric reference 1.

In the application considered, this touch interface is intended to be embedded on board a cockpit of an aircraft, such as a commercial airplane, to control a set of equipment items or functions of the airplane.

As can be seen in this figure, the interface 1 is organized around a touch screen 2 which is associated with a central processing unit CPU which incorporates all the hardware and software means for managing the operation of the interface and with a graphics processing unit GPU which, together with the central processing unit CPU, ensures the display on the screen of graphical objects O each making it possible to control the operation of one or more equipment items or functions of the airplane.

This touch screen 2 is also associated with a touch controller 3 which makes it possible to interpret touches or touch gestures and incorporates one or more sensors ensuring the actual detection of the touches or touch gestures.

In the conventional manner, the interface 1 is complemented by a set of memories 4 which include, in particular, a random access memory and a read-only memory in which are loaded the programs for operating the interface 1.

All of these elements, namely, in particular, the central processing unit CPU, the graphics processing unit GPU, the touch controller 3, the sensors and the set of memories 4, can be placed on one or more printed circuits and communicate via a bus network.

It will be noted that the touch screen 2 can be either intrinsically a touch screen or made to be a touch screen.

Figure 2:
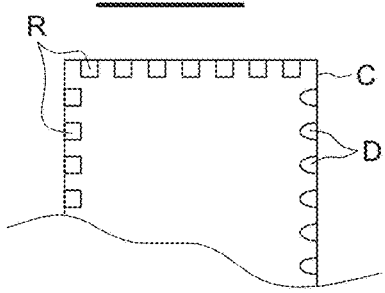
FIG. 2 is a detail view of the screen of the touch interface of FIG. 1.

Referring to FIG. 2, preferably the touch screen 2 is a screen of infrared type made to be a touch screen by equipping the frame C of the screen with an array of diodes D associated with a corresponding array of receivers R equipped with filters for filtering the radiation picked up by the sensors outside the wavelength of the radiation emitted by the diodes.

As indicated previously, the graphics processing unit GPU provokes the display, on the touch screen 2, of a certain number of graphical objects O that can be manually actuated to control one or more equipment items or functions of the aircraft in which the interface 1 is embedded. These are preferably icons, in this case, hypothetically, nine of them, whose graphical representation corresponds to that of the controlled equipment item or function. With regard to the critical functions, in particular those which have a particular impact on performance levels of the flight, in order to avoid erroneous or accidental activations the graphics processing unit GPU also provokes the display, on the screen, for each critical function to be protected, of a second graphical object which makes it possible to disable the operation of the graphical object associated with this critical function.

For example, as can be seen in FIG. 1, a certain number of icons O1, O2 and O3 each control a critical function or an equipment item.

For these first graphical objects, the graphics processing unit provokes the display of a second graphical object O'1, O'2 and O'3 each making it possible to disable the operation of the first graphical object with which it is associated.

Preferably, and as represented, the second graphical object is superposed on the first graphical object with which it is associated in order, on the one hand, to make it possible to identify the first graphical object whose operation is disabled and, on the other hand, to disable its operation.

Figure 3:
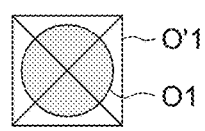
FIGS. 3 to 6 illustrate the implementation of the method for controlling an equipment item or a function by means of the interface of FIG. 1.

The second graphical objects are each likely to adopt a first configuration that can be seen in FIGS. 1 and 3 in which the second graphical object is superposed on the first graphical object and the first graphical object is disabled and a second configuration, that can be seen for example in FIG.

5, in which the second graphical object is offset relative to the first graphical object, to make it accessible.

Figure 5:
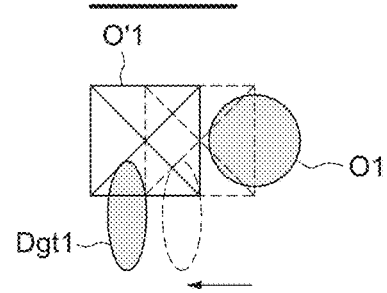
Figure 4:
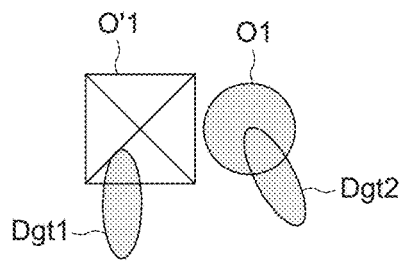
Figure 6:
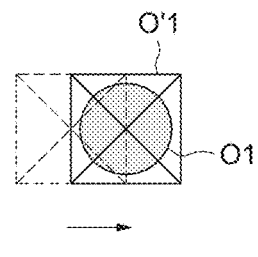

Thus, as can be seen in FIGS. 4 and 6, the switching of the second graphical object such as O'1 from the first configuration to the second configuration is here performed by means of a gesture tending to position a finger Dgt1 of a user on this second graphical object and displacing it laterally until the second graphical object is situated in its second configuration (FIG. 5). In this position, that is to say, after the touch controller has detected and interpreted the gesture for unlocking the equipment item or the function disabled by the second graphical object, the first graphical object, such as O1, is rendered activatable. In this respect, provision can be made, in this position, for its appearance to be modified, for example by changing its color or its intensity so as to show the user that it can now be activated. The equipment item or the function associated with the first graphical object can then be controlled when the graphics controller detects that a corresponding control gesture has been made in relation to the first graphical object.

According to a particularly advantageous aspect of the invention, the protected function can be activated by displacing the second graphical object O'1 until it is situated in the second configuration and while the second graphical object is kept in this position by one of the fingers Dgt1 of the user, the first graphical object possibly manipulated by a second finger Dgt2 (FIG. 4) to control the activated function.

It will moreover be noted that the first configuration of the second graphical object is a stable position, whereas the second configuration is unstable so that, after this second graphical object is released, the latter reverts spontaneously to its initial position preventing the first graphical object from being maneuvered (FIG. 6). Provision may, for example, be made for this return to the first configuration to be able to take place upon the expiry of a time delay that it long enough to make it possible, according to a particular kinematic scenario, to obtain, for example, a slow displacement of the second graphical object and to make the moment visually aesthetic to the user.

In the exemplary implementation which has just been described, the switch from the first configuration to the second configuration is performed by a lateral offsetting of the second graphical object, here to the left. Obviously, such an offsetting can be done either to the right or upward or downward, or even in any other direction.

Similarly, there is no departure from the scope of the invention when the switch from the first configuration to the second configuration is made by any other gesture detected by the touch controller.

In the exemplary embodiment considered, the first graphical object takes the form of an icon illustrating the controlled function. Meanwhile, the second graphical object takes the form of a grid making it possible, on the one hand, to leave the icon that it covers visible and, on the other hand, to visually simulate the cap used in traditional interfaces.

It will finally be noted that the second graphical object can be associated with a visual indication making it possible to inform the user of the gesture to be used to provoke its manipulation.

Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as examples of embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. A method for controlling an equipment item or a function by means of a touch interface, comprising:
    displaying, on a touch screen of the touch interface, a first graphical object configured to be manipulated to control said equipment item or said function and a second graphical object in a first position superposed on said first graphical object, wherein the first graphical object is disabled and cannot be manipulated while the second graphical object is superposed over the first graphical object;
    detecting a first gesture on the touch screen in which a first finger of a user is positioned on the second graphical object and displaces the second graphical object from the first position to a second position in which the first graphical object is activated and can be manipulated by a finger of a user;
    activating the first graphical object when the second graphical object is moved to the second position by the first finger of the user;
    detecting a second gesture on the touch screen in which the activated first graphical object is manipulated by a second finger of the user while the second graphical object is kept in the second position by the first finger;
    detecting release of the second graphical object by the first finger and, reverting the second graphical object to the first position upon release of the second graphical object, and wherein the first graphical object is disabled and prevented from being manipulated when the second graphical object reverts to the first position.

2. The method according to claim 1, wherein, from the second position, the second graphical object reverts to the first position on expiry of a time delay.

3. The method according to claim 1, wherein, when the second graphical object is in the second position, the appearance of the first graphical object is modified.

4. The method according to claim 1, wherein the second graphical object is in the form of a grid.

5. The method according to claim 1, wherein the controlled equipment item or function is an equipment item or a function embedded onboard an aircraft.

6. A touch interface, comprising a touch screen, a touch controller suitable for interpreting gestures on the touch screen, and a graphics processing unit (GPU) associated with a central processing unit (CPU) suitable for implementing a method for controlling an equipment item or a function by means of the touch interface, the method comprising:
    displaying, on the touch screen of the touch interface, a first graphical object configured to be manipulated to control said equipment item or said function and a second graphical object in a first position superposed on said first graphical object, wherein the first graphical object is disabled and cannot be manipulated while the second graphical object is superposed over the first graphical object;
    detecting a first gesture on the touch screen in which a first finger of a user is positioned on the second graphical object and displaces the second graphical object from the first position to a second position in which the first graphical object is activated and can be manipulated by a finger of a user;

activating the first graphical object when the second graphical object is moved to the second position by the first finger of the user; and detecting a second gesture on the touch screen in which the activated first graphical object is manipulated by a second finger of the user while the second graphical object is kept in the second position by the first finger;

detecting release of the second graphical object by the first finger and, reverting the second graphical object to the first position upon release of the second graphical object, and wherein the first graphical object is disabled and prevented from being manipulated when the second graphical object reverts to the first position.

7. The touch interface according to claim 6, wherein the touch interface is an interface of infrared type.

8. The touch interface according to claim 6, wherein the touch interface is a human-machine interface embedded onboard an aircraft.

* * * * *